United States Patent

[11] 3,596,048

| [72] | Inventors | Toyoo Maeda<br>Tokyo-to;<br>Toshio Yada, Yokohama-shi; Akira Yamaoka, Tokyo-to, all of, Japan |
|------|-----------|---|
| [21] | Appl. No. | 852,228 |
| [22] | Filed | Aug. 22, 1969 |
| [45] | Patented | July 27, 1971 |
| [73] | Assignee | Ishikawajima-Harima Jukogyo Kabushiki Kaisha<br>Tokyo-to, Japan |
| [32] | Priority | June 14, 1969 |
| [33] | | Japan |
| [31] | | 44/47082 |

[54] TRACKLESS AUTOMATIC WELDING MACHINE
4 Claims, 4 Drawing Figs.

[52] U.S. Cl. .................................. 219/125 PL, 228/8
[51] Int. Cl. .................................. B23k 9/12
[50] Field of Search .................................. 219/124, 125, 124 PL, 137; 228/8—10, 45

[56] References Cited
UNITED STATES PATENTS

| 2,439,740 | 4/1948 | Johnson | 219/125 |
| 2,839,663 | 6/1958 | McCollum | 219/125 X |
| 2,846,898 | 8/1958 | Cink | 219/125 X |
| 3,171,012 | 2/1965 | Morehead | 219/124 |
| 3,408,475 | 10/1968 | Fier | 219/125 |

Primary Examiner—J. V. Truhe
Assistant Examiner—L. A. Schutzman
Attorney—Nolte and Nolte ABSTRACT: An automatic welding machine advanced without the track guide having a sliding unit having a welding nozzle, which is in turn connected to a welding line detector, and an automatic steering unit mounted upon a carriage so that the detector may move along a welding line or groove upon movement of the carriage which in turn is maintained in a predetermined spaced-apart relation with the welding line by the simultaneous rotation of respective motors for said units by actuation of a limit switch in the detector. Welding preparation may be much simplified.

TOYOO MAEDA
TOSHIO YADA
AKIRA YAMAOKA
INVENTORS

BY
*Nolte & Nolte*
ATTORNEYS

TRACKLESS AUTOMATIC WELDING MACHINE

BACKGROUND OF THE INVENTION

The present invention relates to a trackless automatic welding machine. In case of welding operation by a welding machine having a carriage such as Unionmelt and MIG welding machines, a rail must be laid in parallel with a welding line. This rail must have the same radius of curvature with that of a welding line when it has a curved welding line within a plane. Alternately, a work to be welded or a welding machine must be mounted upon a rotary table so as to weld along the curved welding line within a plane. Therefore, welding preparation requires tedious operations and a long time.

SUMMARY OF THE INVENTION

The primary object of the present invention is therefore to provide an automatic welding machine which can be correctly advanced along any welding line without the aid of a guide rail or track so as to weld along the welding line accurately, thereby eliminating the tedious welding preparation such as laying the guide rail and improving the welding operation.

Inn brief, according to the present invention a sliding unit having a welding torch or nozzle is mounted upon a carriage and an automatic steering unit is attached to the front of or within this carriage. A welding line detector is attached to the welding torch or nozzle through an insulator so as to move along a welding as the carriage is advanced, and by the simultaneous rotations of the motors incorporated in the sliding and automatic steering units respectively upon the actuation of a limit switch incorporated in the welding line detector the carriage is maintained in a predetermined spaced-apart relation with the welding line.

According to the present invention the following advantages may be attained. That is, without the use of a guide rail which is required in a conventional welding machine, an automatic welding may be correctly accomplished along any welding line or shape; an operator may operate a plurality of automatic welding machines of the present invention in a well-safeguarded manner since the present automatic guidance system, consisted of the sliding and steering units and the weld line detector, can easily be adjusted to operate in a practically self-converging manner, as explained afterwards; and a conventional welding machine carriage may be easily converted into the automatic welding machine of the present invention.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
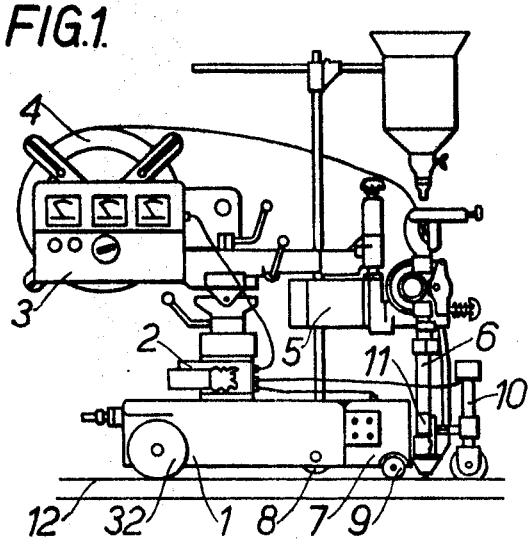
FIG. 1 is a side view of one embodiment of the present invention.
Figure 2:
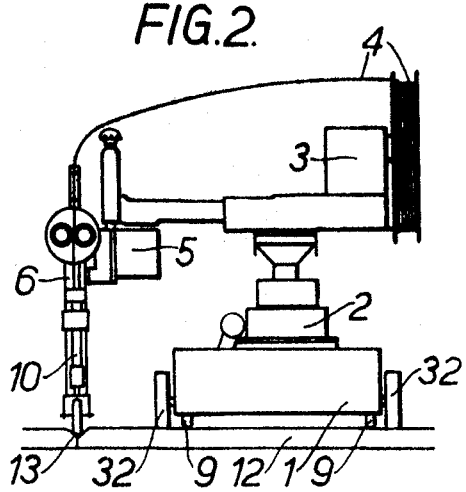
FIG. 2 is a front view as seen from the direction of the movement of the machine.

Upon a carriage 1 is mounted a sliding unit 2 having a motor 26 and upon the sliding unit 2 are mounted a welding control unit 3, a welding wire 4, a wire feeding motor 5 and a welding nozzle 6 all constructed in unitary construction.

As shown in FIG. 1, an automatic steering unit 7 is attached to the front portion of the carriage 1 and drive wheels 32 of the carriage 1 and supporting wheels 9 of the automatic steering unit 7 are grounded so that a front wheel 8 of the carriage may be spaced apart from the surface of the floor. A welding line detector 10 is attached to the welding nozzle 6 through an insulator 11.

Figure 3:
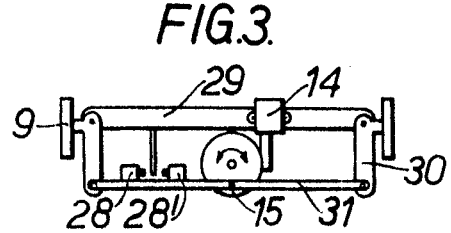
FIG. 3 is an explanatory view of a mechanism for automatic steering unit of the present invention.

As shown in FIG. 3, a handle motor 14 is secured to a transverse frame 29 to both ends of which are pivoted ends at one edge of the supporting levers 30 which support the wheels 9 while ends at the other edge of the levers 30 are connected by a connecting member 31. The connecting member 31 may be displaced to right or left relative to the transverse frame 29 by means of disk 15 which is rotated in both directions by the handle motor 14 so that the wheels 9 may be steered. The movement of the connecting member 31 relative to the transverse frame 29, that is the steering of the wheels 9 may be controlled by limit switches 28 and 28'.

Figure 4:
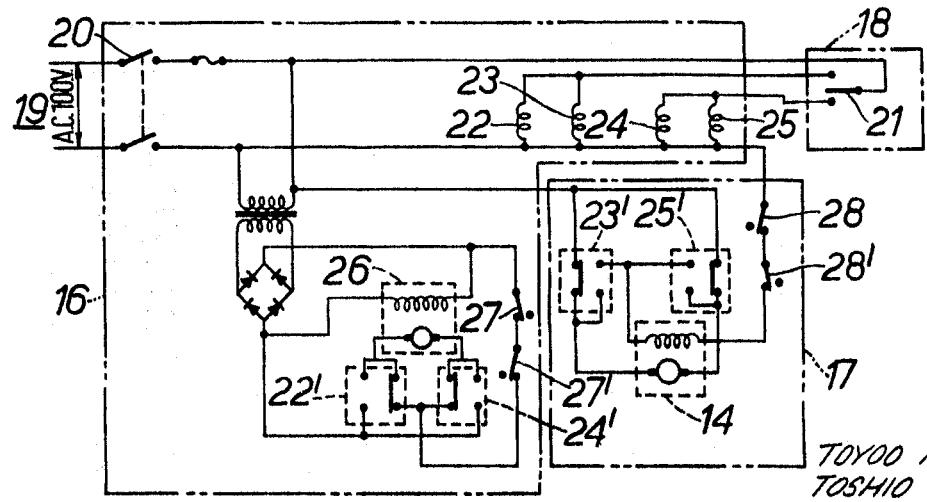
FIG. 4 is an electric circuit of the welding machine of the present invention.

In the welding machine with the construction described above are incorporated an electric circuit 16 for the sliding unit 2 encircled by the two-dot line in FIG. 4 and electric circuits 17 and 18 for the automatic steering unit 7 and the welding line detector 10 respectively all of which are electrically connected to a power source 19 at the side surface of the welding control unit 3 through cables.

In the FIGS., reference numeral 12 designates an object to be welded; 13, a welding groove; 20, a main switch; 21, a limit switch, 22, 23, 24 and 25, relay coils; 22', 23', 24' and 25', relay contacts; 26, a motor and 27, 27', 28 and 28', switches.

Next the mode of operation of the welding machine of the present invention will be described in more detail hereinafter. The carriage 1 is placed directly upon the object 12 through the driving wheels 32 and the supporting wheels 9 and a small diameter wheel at the forward end of the welding line detector 10 is fitted into the welding groove 13 of the object 12. Thus, the welding line detector 10 may move and detect the groove 13 as the carriage 1 is advanced in spaced-apart relation with the axis of the unit 2. Welding may be started by turning on the main switch 20 so as to supply AC 100 v. from the power source 19.

When the direction of the movement of the carriage 1 is misaligned with the direction of the groove 13 during welding so that the spacing between the axis of the sliding unit 2 and the groove 13 is increased or decreased beyond a predetermined extent, the limit switch 21 in the welding line detector 10 is actuated so that the upper or lower contact shown in FIG. 4 is closed, thereby energizing the relay coil 22 or 24 of the sliding unit 2 and that 23 or 25 of the automatic steering unit. Thus, the relay contact 22' or 24' of the sliding unit 2 and that 23' or 25' of the automatic steering unit are closed so that the motor 26 of the sliding unit and the handle motor 14 of the automatic steering unit are rotated in the clockwise or counterclockwise direction.

Upon rotation in the clockwise or counterclockwise direction of the motors 26 and 14, the sliding unit 2 and the automatic steering unit 7 will be operated as follows.

When the carriage 1 is moving away or toward the groove 13, the motor 26 of the sliding unit 2 is rotated in the direction so that the welding unit upon the sliding unit 2 may not be moved away or toward the groove 13. That is, the carriage 1 is spaced apart from or moved toward the welding nozzle 6. Simultaneously, the motor 14 of the automatic steering unit is rotated in such a direction that the carriage 1 is steered so as to move it toward or away from the groove 13.

The above-described rotations of the motor 26 of the sliding unit and the handle motor 14 of the automatic steering unit for moving the carriage 1 away or toward the welding nozzle 6 and for moving the carriage 1 toward or away from the groove 13 respectively are effected only within a time when the limit switch 21 of the welding line detector is energized. Furthermore, the angles of rotation of both of the motors 26 and 14 are so adjusted that the welding machine carriage 1 is not oversteered by one steering operation but is steered gradually by the continuous operations, thereby returning the carriage 1 to its correct direction for welding. Thus, the carriage 1 is always spaced apart from the groove 13 by a predetermined distance.

In order to prevent both of the sliding unit motor 26 and automatic steering motor 14 from being damaged, the right and left limit switches 27 and 27' for limiting the sliding width and the limit switches for limiting the rotation of the automatic steering motor are provided as shown in FIGS. 3 and 4.

The present invention has been so far described with particular reference to one illustrative embodiment thereof, but it will be understood that variations and modifications are effected without departing from the scope of this invention as described hereinabove and as defined in the appended claims.

What we claim is:

1. A trackless automatic welding unit, comprising a carriage adapted to move parallel to a welding line, a sliding unit mounted on the carriage for sliding transverse to the welding line, a welding nozzle fixed to the sliding unit and at all operative positions of the sliding unit being spaced from the carriage in a direction transverse to the welding line for following the welding line, fixed to the welding nozzle means for detecting the welding line, a steering unit fixed to the carriage for steering the carriage, a first electric motor operatively connected to the sliding unit for actuation of the sliding unit, a second electric motor operatively connected to the steering unit for actuation of the steering unit, said welding line detecting means including a limit switch and means for actuating the switch when the welding nozzle departs from the welding line by a predetermined distance and electric circuit means operatively connecting the first and second motors to the switch for simultaneous actuation of the motors when the switch is actuated thereby so to actuate the sliding unit and the steering unit as to return the welding nozzle to the welding line.

2. A welding unit according to claim 1, further comprising means for fixing the welding-line-detecting means to the welding nozzle, said fixing means including electrical insulation electrically insulating the detecting means from the nozzle.

3. A welding unit according to claim 2, in which said carriage includes a pair of drive wheels partly supporting the carriage and arranged for rotation about an axis transverse to the welding line and means for driving the drive wheels thereby to drive the carriage.

4. A welding unit according to claim 3, in which said steering unit comprises four members articulated to one another at their ends to form a closed quadrilateral figure, alternating ones of said members constituting pairs of members of equal length whereby said figure is a parallelogram, a wheel mounted on each member of one of the pairs of parallel members for rotation about an axis parallel to the other pair of parallel members, the second motor being mounted on one member of the other pair of parallel members, operatively interconnecting the second motor with the other member of the other pair of members means for driving the other member lengthwise in either direction thereby to reorient the wheels of the steering unit.